United States Patent [19]
Katona

[11] 4,344,217
[45] Aug. 17, 1982

[54] AUTOMATIC STAPLING AND CUTTING MACHINE

[75] Inventor: Joseph W. Katona, Walled Lake, Mich.

[73] Assignee: Mills Products, Inc., Farmington, Mich.

[21] Appl. No.: 98,934

[22] Filed: Nov. 30, 1979

[51] Int. Cl.$^3$ ........................ B23P 17/00; B23P 11/00
[52] U.S. Cl. ...................................... 29/417; 29/33 K; 29/243.56
[58] Field of Search ................. 29/411, 417, 509, 515, 29/243.56, 33 F, 33 K; 53/138 A, 567; 493/195–197, 200–202

[56] References Cited

U.S. PATENT DOCUMENTS

| | | | |
|---|---|---|---|
| 2,845,693 | 8/1958 | Shetterly et al. | 29/411 |
| 3,234,705 | 2/1966 | Schwartz | 493/195 X |
| 3,865,018 | 2/1975 | Gaffney | 493/196 |

*Primary Examiner*—James G. Smith
*Attorney, Agent, or Firm*—Whittemore, Hulbert & Belknap

[57] ABSTRACT

A machine is provided for cutting to length and joining two lengths of strand material at their ends to produce a band. A method of producing a band from two lengths of strand material is also provided.

7 Claims, 6 Drawing Figures

38
46
44
42
51
44'
48
22
24
36
50

54
124
96
56
122
92
128
55
94
58
126
90
120
P 70
112
20
72
82
102
86
24
81
78
74
84
79
22
80
88
17
14
76
93
77
73
95
96

92
94
90

AUTOMATIC STAPLING AND CUTTING MACHINE

This invention relates generally to a machine and method for producing bands, and refers more particularly to a machine and method for cutting to length two lengths of strand material and joining them at the ends to produce bands.

SUMMARY OF THE INVENTION

In general, the object of the invention is to provide an improved machine and method for producing a band from two strands of material.

In accordance with an embodiment of the invention about to be described, two lengths of strand material are advanced side by side along a predetermined path. At a first station along the path, the two lengths of strand material are connected together at two closely longitudinally spaced points at each of several locations along the length of the two lengths of strand material. In the apparatus of the embodiment about to be described, the securing together of the strand material is carried out by staplers.

At a second station along the path, the two lengths of strand material are cut at each location between the two staples, producing bands each of which are formed of two flexible strands connected to one another at their ends.

The stapling and cutting may be carried out simultaneously.

DESCRIPTION OF THE DRAWINGS

Other objects and advantages of this invention will be apparent as the following description proceeds, especially when considered with reference to the accompanying drawings, wherein.

Figures 1, 2, 3:
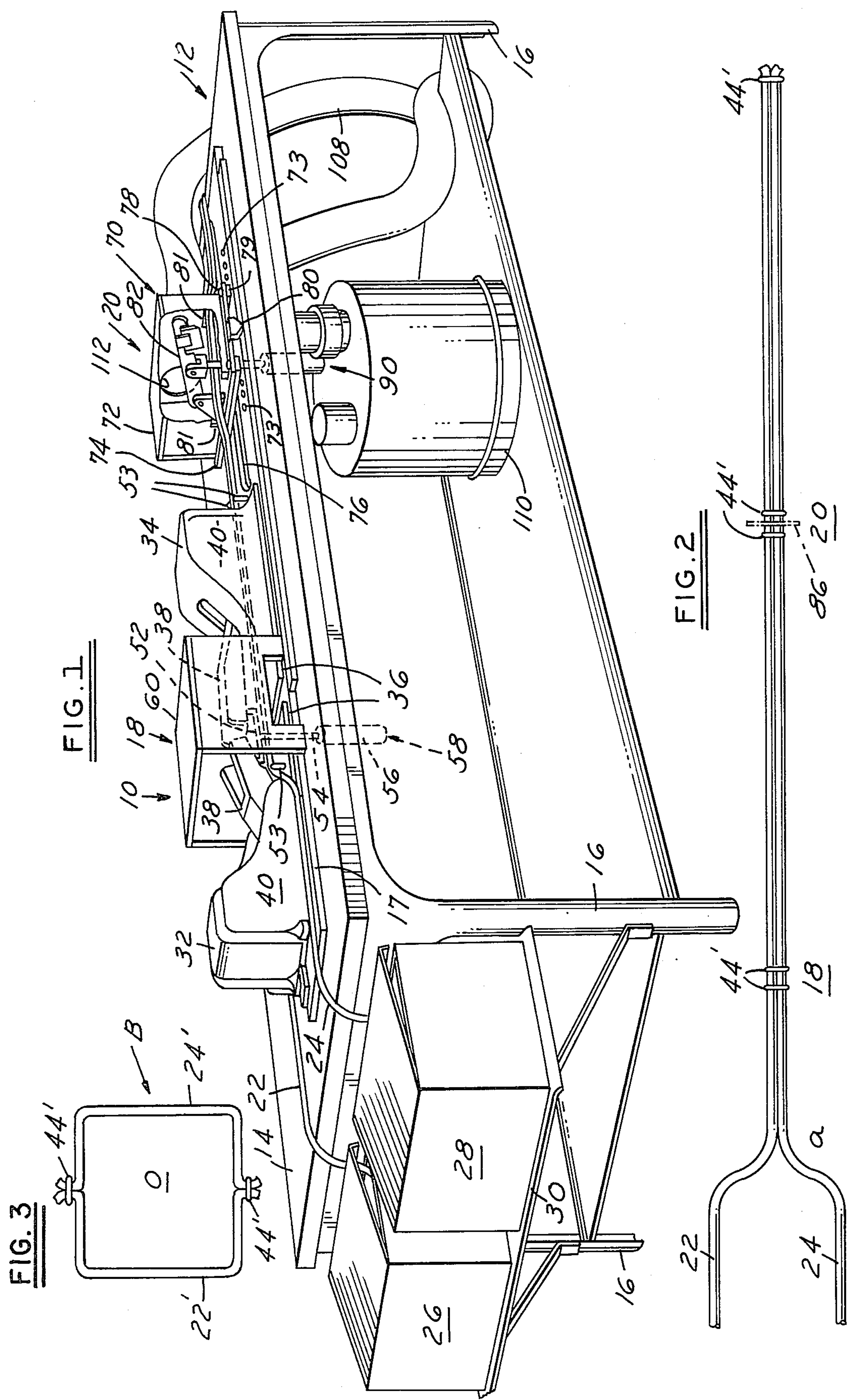
FIG. 1 is a perspective view of apparatus constructed in accordance with the invention and adapted for use in carrying out the method of the invention.
FIG. 2 is a view showing two lengths of strand material stapled together at plural locations along the length thereof and indicating the severing or the cutting of the strand material between the staples to produce bands.
FIG. 3 is a view of a band produced by the method and apparatus of this invention, shown fitted or stretched over an object.

Referring more particularly to the drawings and especially to FIG. 1 thereof, the machine 10 comprises a work bench 12 having an elongated table top 14 supported on legs 16. An elongated flat horizontal bed plate 17 is supported lengthwise on the table top. On the bed plate 17, there is a first station 18, referred to hereinafter as a stapling station, and spaced longitudinally from the first station there is a cutting station 20.

Two lengths of strand material 22 and 24 are adapted to be drawn lengthwise over the bed plate 17 in spaced generally parallel relation past the stapling station 18 and the cutting station 20 in sequence. These two lengths of strand material are flexible and may be stretchable. They may, for example, consist of fiberglass, cord, roping, rubber, or plastic extrusions. Supplies of strand material are contained in bulk pack cartons 26 and 28 supported on a shelf 30 at one end of the machine. As shown in FIG. 1, the lids of the two cartons are open to permit the strand material to be drawn continuously from the cartons. Obviously any other suitable means for containing supplies of strand material, such for example, as supply spools or rolls, may be employed.

At the stapling station 18, there are two staplers 32 and 34 of any suitable construction. These staplers in the present instance are identical and, therefore, a description of one will be sufficient for both. Each illustrated stapler has an anvil or base 36 extending beyond one end of housing 40 and an arm 38 pivoted to the housing above the anvil. The arm 38 has an elongated hollow body portion 42 containing a supply of U-shaped staples 44 in a chamber therein. A hammer 46 having a skirt portion 48 extending over the sides of the body portion 42 is moveable vertically within the body portion to force one staple at a time down towards the anvil so that the lead ends of the staple engage the die portion 50 of the anvil to shape the staple to the clinched form indicated at 44'. These are, of course, standard staplers operating in the usual way.

The two staplers 32 and 34 are secured in fixed positions on the bed plate 17 with the arms 38 extending toward one another and the dies 50 of the two anvils spaced apart longitudinally of the bed plate only a short distance. The skirt portion 48 of the hammers 46 of both staplers are connected to a plate 52 to which is connected the rod 54 of the piston 55 in cylinder 56 of the piston-cylinder assembly 58. Cylinder 56 is secured to the underside of table top 14 and rod 54 extends through suitable openings in the table top and bed plate.

A housing 60 disposed over the arm portion of the two staplers is provided as a work shield and may be transparent.

It will be noted in FIG. 1 that the paths of the two lengths of strand material extend lengthwise of the table top, passing around the outer sides of the stapler 32, then in side-by-side contact or near contact over the dies 50 of the two anvils and through the space 51 in the body portion 42 of stapler 34 to the cutting mechanism. The paths of the two lengths of strand material, as guided by pins 53, are shown in FIG. 2, point a indicating where they extend around stapler 32, the numeral 18 indicating the stapling station, and downstream from the stapling station the numeral 20 indicating the cutting station. It will be obvious that the operation of the piston-cylinder assembly 58 to retract the piston 54 will pivot the body portions 42 of the two stapler arms downwardly after which the hammers 46 will clinch the two staples around the two lengths of strand material at two closely spaced points. Extension of the piston rod 54 will raise the two stapler arms preparatory to stapling the two lengths of strand material together at another location.

The other station 20 has a cutting mechanism 70 the purpose of which is to sever the two lengths of strand material between the two staples that are applied at the stapling station. The cutting unit comprises a transparent housing 72 mounted on a base plate 74 over a portion of the bed plate 17 which has an elongated longitudinally extending slot 76. A similar registering slot 77 is formed in the table top 14. Bearing strips 79 on the undersides of the base plate rest upon the bed plate and are secured thereto by fasteners 78 at selected longitudinally spaced points as determined by the holes 73 therein for receiving the fasteners. Flanges 80 on opposite sides of the base plate 74 engage opposite edges of the bed plate to locate the cutting unit laterally. Openings 81 in the opposite walls of the housing 72 clear the strand material.

The cutting unit includes a cutter bar 82 pivoted at one end to support 84 on base plate 74. A cutter blade 86 mounted on the other end of the cutter bar is adapted to sever the strand material. A narrow slot 88 in base plate 74 into which the cutting blade extends on its cutting stroke provides a cooperating edge with which the blade co-acts to cut through the strand material.

The cutter bar is raised and lowered by a piston-cylinder assembly 90 having a cylinder 92 secured to the underside of the table top 14 and having a piston 94 reciprocable therein. Fasteners 93 extend through the cylinder flange 95 and into holes in the table top 14 to secure the cylinder thereto. Suitable additional holes for the fasteners 93 are spaced along the length of the slot in the table top for mounting of the cylinder as required depending on the desired position of the cutting mechanism. The piston rod 96 extends through slots 76 and 77 in the bed plate and table top and is joined to a coupling 102 connected by a pin and slot to the cutter bar.

Loose cuttings that may result from the cutting operation are evacuated from the housing 72 by a hose 108 and a vacuum attachment 110. One end of the hose is connected to the housing 72 through a hole 112, and the other end of the hose is connected to the vacuum attachment. The vacuum attachment may be of any suitable construction, such, for example, as a motor driven blower.

FIG. 3 illustrates a band B produced by the method and apparatus of this invention, shown extended or stretched over an object O and consisting of two strands 22' and 24' connected at the ends by staples 44'.

Figures 4, 5, 6:
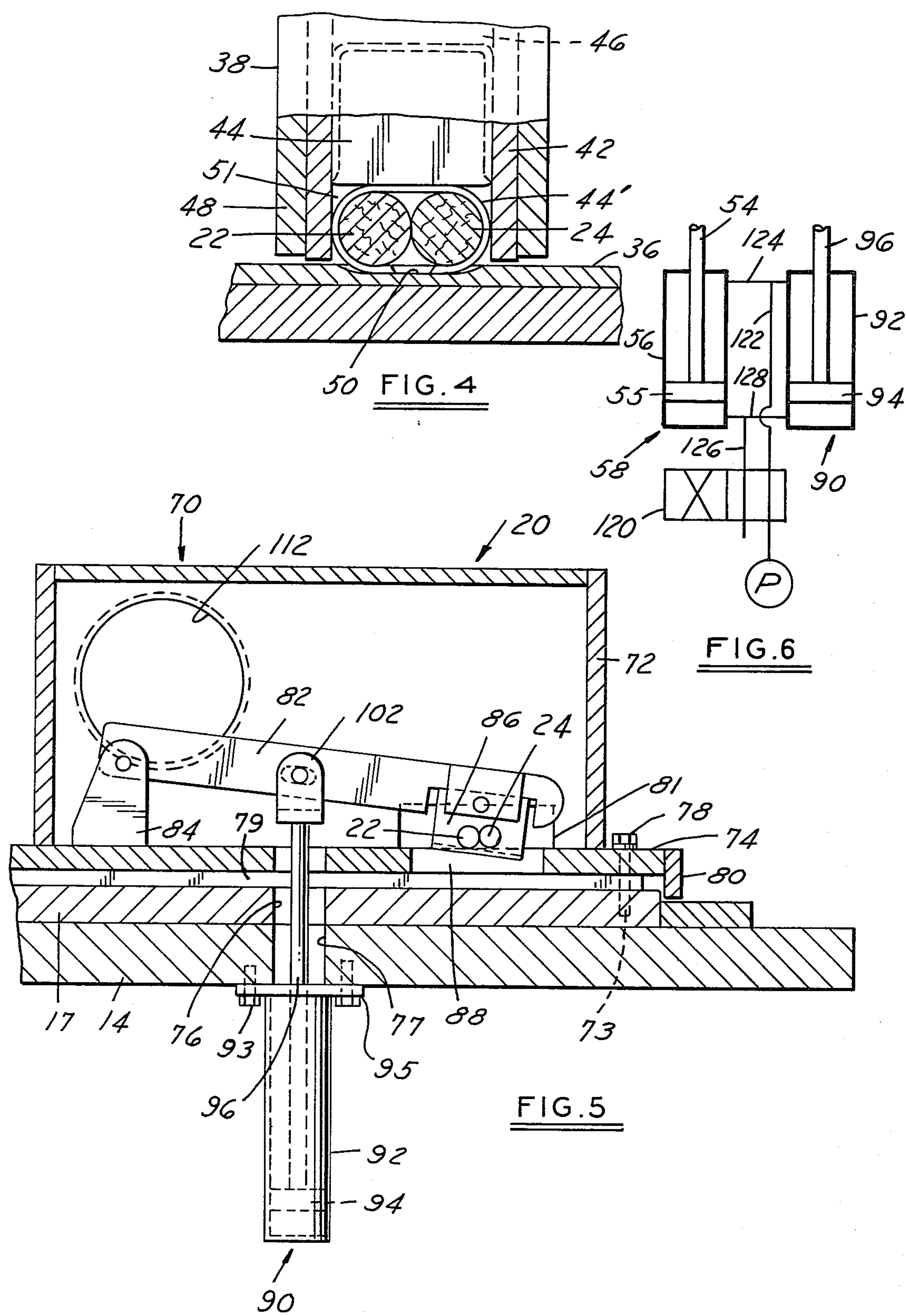
FIG. 4 is a fragmentary sectional view of one of the staplers.
FIG. 5 is a sectional view showing the cutting mechanism.
FIG. 6 is a diagrammatic view of the cylinders for operating the staplers and the cutting mechanism and the valve for operating the cylinders.

FIG. 6 is a diagrammatic view of the piston-cylinder assemblies 58 and 90 for operating the staplers 32 and 34 and the cutting mechanism 70, and of the valve 120 for controlling such operation. The valve 120 is a two position valve and in the position shown directs fluid under pressure from pump P to the rod ends of the cylinders through lines 122 and 124 and relieves fluid pressure in the head ends of the cylinders through lines 126 and 128. When the valve is shifted to its other position, obviously the fluid pressure is directed to the head ends of the cylinders and the rod ends are relieved.

In operation, the two lengths of strand material are hand drawn lengthwise over the bed plate 17 from left to right in FIG. 1, passing around the outer sides of the stapler 32, then side-by-side over the dies 50 of the two anvils and through the space 51 in the body portion 42 of the stapler 34 to the cutting mechanism 70. Pins 53 guide the strands along their paths. At this time, the valve 120 is in the other position from that shown in FIG. 6 in order to raise the arms 38 of the staplers and the cutter bar 82 of the cutting mechanism. Then, while the strand material is stationary, valve 120 will be shifted to the position shown in FIG. 6 to simultaneously operate the two staplers and the cutter bar, with the result that two closely spaced staples are applied to the two strands of material at the stapling station 18 and the two strands of material are severed or cut-off at the cutting station 20. The valve is then returned to the other position from that shown in FIG. 6 to raise the stapler arms and the cutter bar.

Thereafter the two strands of material are hand drawn further from left to right in FIG. 1 over the bed plate of the machine until the two staples previously applied assume a position on opposite sides of the narrow slot 88 in the base plate 74 of the cutting mechanism. Then with the strand material stationary, the valve 120 is again shifted to the FIG. 6 position so that two more closely spaced staples are applied to the two strands of material at a second location spaced from the first, while simultaneously the two strands of material are severed or cut between the previously applied two staples.

This procedure continues, applying two closely spaced staples at other locations during each actuation of the staplers while simultaneously cutting between the two staples previously applied, until the desired number of bands have been formed. The locations along the length of the strand material where the staples are applied are spaced apart equally.

It will be obvious that the size of the band may be increased or decreased by changing the spacing between the stapling station 18 and the cutting station 20. This can be accomplished by moving the cutting mechanism toward or away from the stapling station and securing it in adjusted position by the fasteners 78 and also securing the piston-cylinder assembly 90 in the adjusted position by fasteners 93.

I claim:

1. Apparatus for producing a plurality of bands each formed of two flexible strands secured to one another at the ends thereof but free of connection between said ends from two lengths of strand material, comprising connecting means for connecting together said two lengths of the strand material at two closely longitudinally spaced points, cutting means for cutting said strand material between said two closely longitudinally spaced points, and means for supporting said connecting means and said cutting means in spaced relation to one another so that said two lengths of strand material may be connected together by said connecting means at two closely longitudinally spaced points at one location along the length of said two lengths of strand material and subsequently connected together by said connecting means at two closely longitudinally spaced points at other locations along the length of said two lengths of strand material and also may be cut by said cutting means between said two closely longitudinally spaced points at all said locations to produce a plurality of said bands secured to one another at the ends thereof but free of connection between said ends, said connecting means comprising two staplers.

2. Apparatus as defined in claim 1, including means for operating said connecting means and said cutting means simultaneously so that said two lengths of strand material may be cut at one location at the same time that they are connected together at another location.

3. Apparatus as defined in claim 1 or 2, wherein the supporting means for said connecting means and cutting means is adjustable to vary the spacing therebetween.

4. A method of producing a plurality of bands each formed of two flexible strands connected to one another at the ends thereof from two lengths of strand material, comprising advancing said two lengths of the strand material longitudinally along a predetermined path, at a first station along said path connecting together said two lengths of strand material at two closely longitudinally spaced points at one location along the length of said two lengths of strand material and subsequently connecting said two lengths of strand material at two closely longitudinally spaced points at other locations along the length of said two lengths of strand material, and at a second station along said path downstream from said first station cutting said two lengths of strand material between said two closely longitudinally spaced points at all said locations.

5. A method as defined in claim 4, wherein said locations along the length of said two lengths of strand material are equally spaced.

6. A method as defined in claim 5, wherein the advance of said two lengths of strand material is halted during the connecting together and the cutting thereof.

7. A method as defined in claim 4, 5, or 6, wherein the steps of connecting together and cutting are carried out simultaneously at adjacent locations along the length of said two lengths of strand material.

* * * * *